United States Patent
Lotan et al.

(10) Patent No.: US 10,970,300 B2
(45) Date of Patent: Apr. 6, 2021

(54) SUPPORTING MULTI-TENANCY IN A FEDERATED DATA MANAGEMENT SYSTEM

(75) Inventors: Yalon Lotan, Shoham (IL); Gil Tzadikevitch, Yavne (IL); Hadas Avraham, Modiin (IL)

(73) Assignee: Micro Focus LLC, Santa Clara, CA (US)

( * ) Notice: Subject to any disclaimer, the term of this patent is extended or adjusted under 35 U.S.C. 154(b) by 822 days.

(21) Appl. No.: 14/396,131

(22) PCT Filed: Jul. 31, 2012

(86) PCT No.: PCT/US2012/049068
§ 371 (c)(1),
(2), (4) Date: Oct. 22, 2014

(87) PCT Pub. No.: WO2014/021874
PCT Pub. Date: Feb. 6, 2014

(65) Prior Publication Data
US 2015/0088806 A1    Mar. 26, 2015

(51) Int. Cl.
G06F 16/25    (2019.01)

(52) U.S. Cl.
CPC ............ G06F 16/254 (2019.01); G06F 16/25 (2019.01); G06F 16/256 (2019.01)

(58) Field of Classification Search
CPC ......... G06F 17/30563; G06F 17/30557; G06F 17/30566; G06F 17/3056; G06F 17/30575;

(Continued)

(56) References Cited

U.S. PATENT DOCUMENTS

2004/0122958 A1    6/2004 Wardrop
2004/0139075 A1    7/2004 Brodersen et al.
(Continued)

FOREIGN PATENT DOCUMENTS

CN    100348009 C    11/2007
CN    101499061        8/2009
(Continued)

OTHER PUBLICATIONS

Guo et al, "A Framework for Native Multi-Tenancy Application Development and Management", The 9th IEEE International Conference on E-Commerce and The 4th IEEE International Conference on Enterprise Computing, E-Commerce and E-Services (CEC-EEE 2007), Jul. 23-26, 2007, pp. 551-558.*

(Continued)

Primary Examiner — Tony Mahmoudi
Assistant Examiner — Kamal K Dewan (57) ABSTRACT

A system and method for supporting multi-tenancy in a federated data management system are provided herein. The method includes receiving a query from a client at a data management server, wherein the query includes a tenant property condition corresponding to the client. The method also includes identifying an external data store including data specified by the query and determining whether the external data store is multi-tenant enabled. The method further includes removing the tenant property condition and executing the query to retrieve the specified data if the external data store is not multi-tenant enabled.

19 Claims, 4 Drawing Sheets

(58) Field of Classification Search
CPC .. G06F 17/30929; G06F 16/254; G06F 16/25; G06F 16/256
USPC ....... 707/602, 661, 706, 713, 769, 770, 783, 707/802, E17.014
See application file for complete search history.

(56) References Cited

U.S. PATENT DOCUMENTS

| | | | |
|---|---|---|---|
| 2007/0300222 A1 | 12/2007 | Sincaglia et al. | |
| 2008/0250005 A1 | 10/2008 | Dettinger et al. | |
| 2008/0270459 A1* | 10/2008 | Grewal | G06F 17/30566 |
| 2010/0005443 A1 | 1/2010 | Kwok et al. | |
| 2010/0115100 A1 | 5/2010 | Tubman et al. | |
| 2010/0121923 A1* | 5/2010 | Cvetkovic | G06Q 10/06 709/206 |
| 2010/0131473 A1 | 5/2010 | Bjork et al. | |
| 2011/0047125 A1 | 2/2011 | Matsumoto et al. | |
| 2011/0153565 A1 | 6/2011 | Matsubara et al. | |
| 2011/0246449 A1* | 10/2011 | Collins | G06F 17/30463 707/715 |
| 2011/0258179 A1* | 10/2011 | Weissman | G06F 17/30389 707/714 |
| 2011/0270861 A1 | 11/2011 | Arshavsky et al. | |
| 2012/0102067 A1* | 4/2012 | Cahill | G06F 17/30575 707/770 |
| 2012/0221608 A1* | 8/2012 | An | G06F 17/30448 707/812 |
| 2012/0330929 A1* | 12/2012 | Kowalski | G06F 17/30572 707/722 |
| 2013/0097204 A1* | 4/2013 | Venkataraman | G06F 17/30091 707/784 |
| 2013/0238641 A1* | 9/2013 | Mandelstein | G06F 17/303 707/756 |
| 2014/0040999 A1* | 2/2014 | Zhang | G06F 21/31 726/5 |

FOREIGN PATENT DOCUMENTS

| | | |
|---|---|---|
| CN | 101901242 A | 12/2010 |
| EP | 0829811 A1 | 3/1998 |
| EP | 2182448 A1 | 5/2010 |

OTHER PUBLICATIONS

Cunningham, Bryan, "Portland Rug—What's New in BMC Remedy ITSM 7.0 Overview Presentation", accessed on Jul. 3, 2012, 2 pages http://www.slideshare.net/Jacknickelson/portiand-rug-whats-new-in-bmc-remedy-itsm-7bryan.

Korean Intellectual Property Office, International Search Report and Written Opinion, Mar. 29, 2013, 10 pages, Daejeon Metropolitan City, Republic of Korea.

CN First Office Action dated Nov. 11, 2016, CN Patent Application No. 201280072825.3 dated Jul. 31, 2012, State Intellectual Property Office of the P.R. China, 8 pages.

European Patent Office, Extended European Search Report for EP 12882458.8 dated Mar. 17, 2016 (13 pages).

HP Universal CMDB for the Windows and Red Hat Enterprise Linux operating systems, Software Version: 10.00, Release Notes, Jun. 2012, pp. 1-30.

HP, ITIL v3 and your CMDB: using actionable federation to create a configuration management systems, Jun. 2008, pp. 1-12.

Li Xiao-na et al., "Research on multi-tenant data partition mechanism for SaaS application based on shared schema" Journal on Communications, vol. 33, No. Z1, Sep. 30, 2012 (11 pages).

Shaoquan Fang et al: "A comparison of multi-tenant data storage solutions for Software-as-a-Service", The 6th International Conference on Computer Science & Education (ICCSE 2011) Aug. 3-5, 2011. SuperStar Virgo, Singapore; p. 95-98.

* cited by examiner

SUPPORTING MULTI-TENANCY IN A FEDERATED DATA MANAGEMENT SYSTEM

CROSS-REFERENCE TO RELATED APPLICATION

This application is a national stage application under 35 U.S.C. § 371 of PCT/US2012/049068, filed Jul. 31, 2012.

BACKGROUND

Many organizations use diverse data stores to produce, store, and search the organization's data. The diversity of such data stores may result from many factors, including lack of coordination among an organization's operating units, different rates of adopting new technologies, mergers and acquisitions, or geographic separation of the organization's operating units. In many cases, combining the information from these various data stores allows an organization to more effectively exploit the data contained therein. For example, if two organizations merge to form a new organization, the new organization may inherit the data stores of the original organization. However, the data of the original organization may be stored in different types of data stores and/or in different formats than the data of the new organization. Therefore, it may be desirable to integrate the data stored within the diverse data stores such that the data can be easily retrieved from the data stores. This may be accomplished via any of a number of different techniques for retrieving data located on external data stores, including data warehousing and database federation techniques. Data warehousing and database federation techniques may be used to retrieve data from external data stores by providing users with a high-level query language that can be used to combine, contrast, analyze, and otherwise manipulate data.

Data warehousing techniques include loading data from one or more external data stores into a data warehouse. However, moving data from external data stores to a data warehouse, as well as transforming the data into a format that is supported by the data warehouse, may be very costly. Therefore, it may be desirable to use database federation techniques or, more specifically, configuration management database (CMDB) federation techniques, instead of data warehousing techniques. CMDB federation techniques may be used to extend the scope of existing topology query language (TQL) capabilities to encompass data that is stored and maintained in one or more external data stores. CMDB federation techniques may provide for the retrieval of such data from the external data stores to a CMDB on-the-fly without having to copy large amounts of data to the CMDB. This may reduce the burden on the CMDB in terms of capacity and performance, and may allow for the integration of a large amount of data located on any number of external data stores.

BRIEF DESCRIPTION OF THE DRAWINGS

Certain examples are described in the following detailed description and in reference to the drawings, in which.

DETAILED DESCRIPTION OF SPECIFIC EXAMPLES

Techniques described herein relate generally to systems and methods for supporting multi-tenancy in a federated configuration data management system. As used herein, the term "tenancy" refers to a logical grouping concept that provides network node grouping, mapping, and security support. As an example, a tenant may be a particular customer within an Internet provider's network. Therefore, the federated configuration data management system described herein is configured to support data stores including data from multiple tenants.

The federated configuration data management system described herein may be used for configuration management applications. As used herein, the term "configuration management" refers to a process by which information about configuration items is maintained and delivered to information technology (IT) services. Configuration management may be used to improve the delivery of IT services by providing accurate data to IT service management processes. A configuration item refers to any component that is to be managed in order to deliver an IT Service. For example, configuration items may include software, models, plans, formal documentation such as process documentation and service level agreements (SLAs), or the like. Information about each configuration item may be recorded in a configuration record within a configuration management database (CMDB). A configuration record is a record containing the details of a configuration item. Each configuration record documents the lifecycle of a single configuration item.

A CMDB is a database used to manage configuration records throughout the lifecycle of the configuration item associated with the configuration record. The CMDB may record the attributes of each configuration item, as well as its relationship with other configuration items. A CMDB may also contain other information linked to configuration items, such as incident records or change records.

A CMDB may only store general information relating to configuration items. The remaining information relating to the configuration items may be stored in external data stores. In many cases, clients desire to use configuration item data that is stored in the external data stores in addition to the configuration item data stored in the CMDB. Therefore, in order to allow retrieval of the configuration item data to be transparent to the user, the CMDB may provide a federation feature.

A federation feature may enable clients to request configuration item data from multiple data stores using CMDB application programming interfaces (APIs) without being aware of the actual location of the configuration item data. The federation feature may search multiple geographically and technologically disparate data stores to locate and transform related configuration item data from the data stores. The CMDB may transparently combine the configuration item data from the data stores and return the combined configuration item data to the client.

Accordingly, the federated configuration data management system described herein may provide uniform access to a number of heterogeneous data stores. The data stores may be federated; that is, they may be linked together into a unified system by the federated configuration data management system to create a federated universal configuration management database (uCMDB). The federated configuration data management system may provide access to the data stores by executing topology query language (TQL) queries received from clients. As used herein, the term "TQL" refers to an object oriented framework for describing applications and business services, and includes both physical and logical objects, their attributes, and their relationships to one another. TQL may enable the creation of graphical views designed to capture relevant interdependencies of items, such as configuration items, across IT services, applications, and infrastructure groups.

More specifically, the federated configuration data management system may execute federated TQL (FTQL) queries. A FTQL is a TQL that includes external configuration items in its definition. An external configuration item is a configuration item that does not originate from the uCMDB. That is, the external configuration item is a class defined in the uCMDB class model, whose specific instances are stored in one or more external data stores rather than in the uCMDB. According to the techniques described herein, the federated configuration data management system may retrieve such external configuration items from multi-tenant enabled external data stores or non-multi-tenant enabled external data stores, or both.

The description that follows refers to specific implementations of a federated configuration data management system. Namely, the description that follows refers to an implementation of an IT system configuration management system, including the use of FTQL queries to access configuration item data within external data stores, and a uCMDB in which are stored at least links to the external data stores. However, those skilled in the art will appreciate that the federated configuration data management system may be used for many other purposes besides configuration management.

Figure 1:
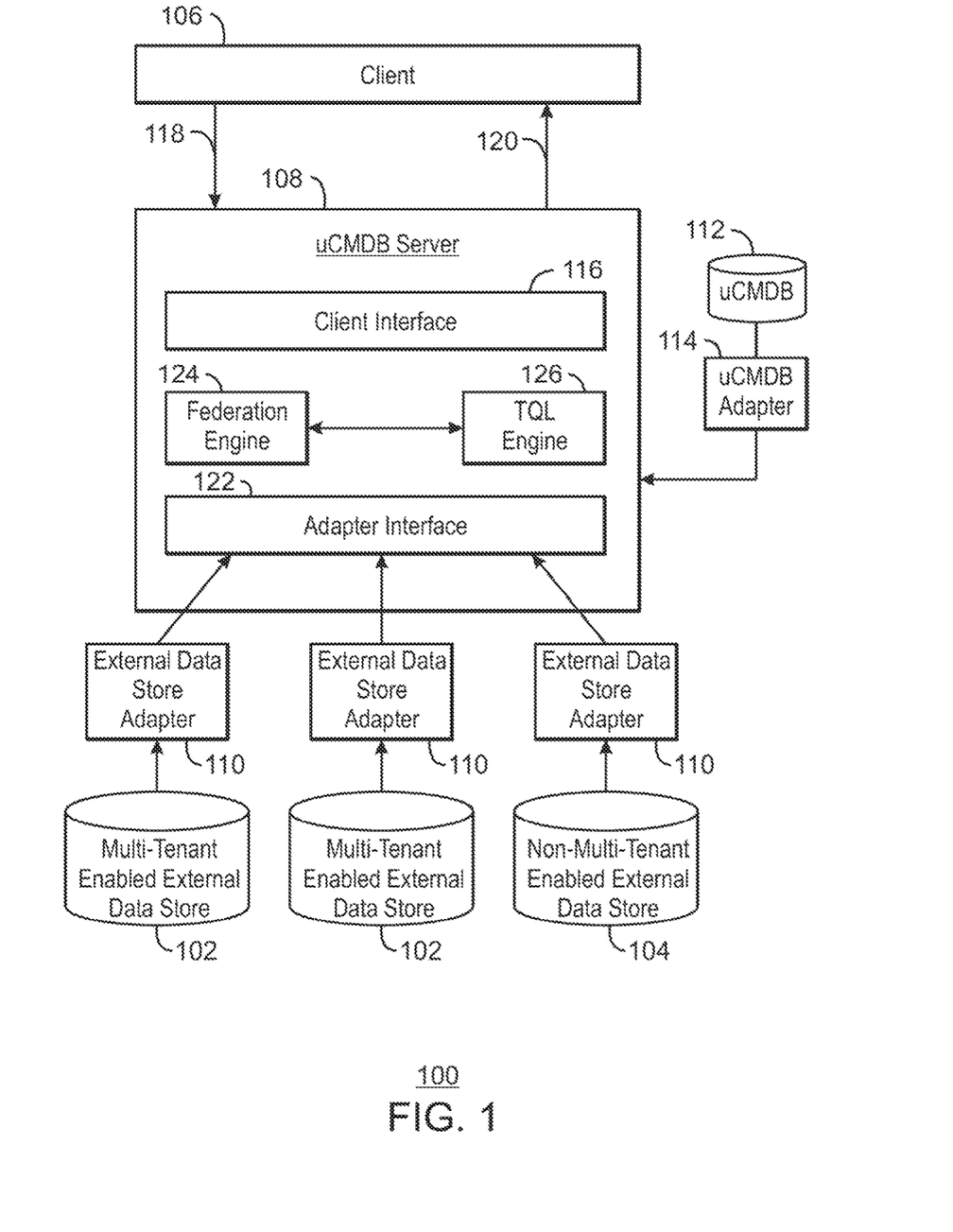
FIG. 1 is a block diagram of a federated configuration data management system that supports multi-tenancy.

FIG. 1 is a block diagram of a federated configuration data management system 100 that supports multi-tenancy. The federated configuration data management system 100 may support multi-tenancy by obtaining data from multi-tenant enabled external data stores 102 or non-multi-tenant enabled external data stores 104, or both, in response to a request from a client 106 and providing only allowed data to the client 106 based on a tenant represented by the client 106, as discussed further below.

The federated configuration data management system 100 may include a uCMDB server 108. The uCMDB server 108 may be communicatively coupled to multi-tenant enabled external data stores 102 and non-multi-tenant enabled external data stores 104 via corresponding external data store adapters 110. The multi-tenant enabled external data stores 102 and the non-multi-tenant enabled external data stores 104 may include any suitable types of data storage systems, such as CMDBs or other databases, where configuration data, including external configuration items and relationships between the external configuration items, are located. The external data store adapters 110 may include adapters developed in the JAVA programming language, or may include generic out-of-the-box (OOB) adapters. In addition, the external data store adapters 110 may include database adapters, uCMDB adapters, or the like.

The uCMDB server 108 may also be communicatively coupled to a universal configuration management database (uCMDB) 112 via a uCMDB adapter 114. The uCMDB 112 may store configuration data, such as general information relating to the configuration items.

In addition, the uCMDB server 100 may be communicatively coupled to the client 106. A client interface 116 within the uCMDB server 108 may enable communication between the client 106 and the uCMDB server 108. The client 106 may be any suitable type of computing device, including a personal computer (PC), laptop computer, mobile computing device, server, or the like. The client 106 may represent a particular customer or user within the federated configuration data management system 100. Thus, according to privacy conditions, the client 106 may have the right to access specific data within the federated configuration data management system 100 that relates to the specific role of the associated customer or user on particular tenants. Such data may be requested by the client 106 via TQL queries or, more specifically, FTQL queries. Accordingly, the client 106 may issue FTQL queries to the uCMDB server 108, as indicated by arrow 118, and may receive FTQL results from the uCMDB server 108, as indicated by arrow 120.

The uCMDB server 108 may receive an FTQL query from the client 106 via the client interface 116, as indicated by the arrow 118. The FTQL query may be a request for specific configuration data, including external configuration items located in any of the multi-tenant enabled external data stores 102 or the non-multi-tenant enabled external data stores 104. Thus, the uCMDB server 108 may retrieve external configuration items from the multi-tenant enabled external data stores 102 or the non-multi-tenant enabled external data stores 104, or both, through the external data store adapters 110. This may be accomplished via an adapter interface 122 that is configured to enable communication between the uCMDB server 108 and the external data stores 102 and 104 through the external data store adapters 110. In addition, a federation engine 124 and a TQL engine 126 within the uCMDB server 108 may direct the retrieval of the external configuration items from any of the external data stores 102 or 104, as discussed further below. The uCMDB server 108 may then return the FTQL results, including the retrieved external configuration items, to the client 106, as indicated by the arrow 120.

The federation engine 124 may be configured to determine appropriate external data stores 102 and/or 104 from which the requested external configuration items may be retrieved. Specifically, the federation engine 124 may build integration point definitions for the retrieval of each requested external configuration item. The integration point definitions may specify the external data store 102 or 104 from which each external configuration item is to be retrieved, as well as the particular external data store adapter 110 associated with the external data store 102 or 104.

The federation engine 124 determines whether each of the external data stores 102 and/or 104 from which the requested external configuration items are to be retrieved is multi-tenant enabled or non-multi-tenant enabled. The federation engine 124 may then direct the retrieval of the external configuration items from the external data stores 102 and/or 104 via the corresponding external data store adapters 110. The federation engine 124 may determine a suitable procedure for the retrieval of each external configuration item based on a tenant represented by the client 106, as well as the one or more tenants supported by the corresponding external data store 102 or 104. For example, if the external configuration items are to be retrieved from a multi-tenant enabled external data store 102, the FTQL query may be executed on the multi-tenant enabled external data store 102, and the TQL engine 126 may retrieve only data that corresponds to the tenant represented by the client 106. On the other hand, if the external configuration items are to be retrieved from a non-multi-tenant enabled external data store 104, the federation engine 124 may remove all references to the tenant represented by the client 106 from the FTQL query prior to execution of the FTQL query on the non-multi-tenant enabled external data store 104. In addition, the FTQL query may only be executed on the non-multi-tenant enabled external data store 104 if the tenant represented by the client 106 matches a default tenant of the non-multi-tenant enabled external data store 104. Techniques for retrieving data from the external data stores 102 and 104 are described further below with respect to FIG. 2.

According to the techniques described herein, the federated configuration data management system 100 may provide data transparency. More specifically, the differences, idiosyncrasies, and implementations of the underlying data sources, including the uCMDB 112 and the external data stores 102 and 104, may be hidden from, i.e., transparent to, the client 106. This transparency allows the FTQL queries to be applied as if all the data exists in the uCMDB 112, although, in fact, the data may be stored in a heterogeneous collection of external data stores 102 and 104.

The federated configuration data management system 100 may also support heterogeneity, or the ability to accommodate a broad range of external data stores 102 and 104 without restriction of hardware, software, data model, interface, or protocol. Further, the federated configuration data management system 100 may support extensibility, or the ability to add new external data stores 102 and/or 104 dynamically in order to meet the changing desires of the client 106.

Figure 2:
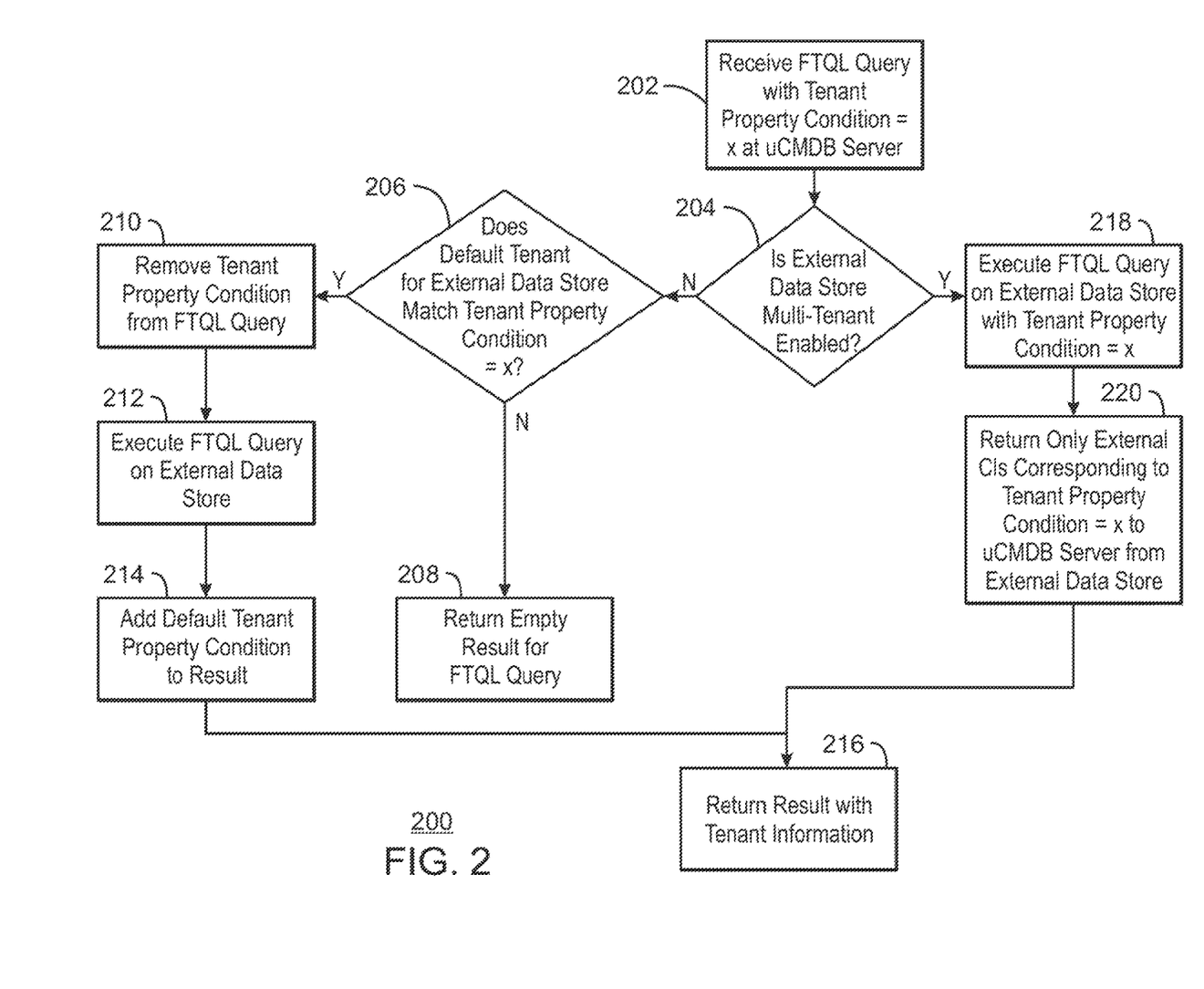
FIG. 2 is a process flow diagram showing a method for executing a federated topology query language (FTQL) query using multi-tenant enabled external data stores or non-multi-tenant enabled external data stores, or any combination thereof.

FIG. 2 is a process flow diagram showing a method 200 for executing an FTQL query using multi-tenant enabled external data stores or non-multi-tenant enabled external data stores, or any combination thereof. In various examples, the method 200 is executed by the uCMDB server 108 within the federated configuration data management system 100 described above with respect to FIG. 2. However, the method 200 may also be executed by any other suitable type of management database within any suitable type of federated data management system.

The method 200 may be executed in a manner that is transparent to the client. Thus, the client may request specific configuration data, such as external configuration items, without regard for whether the one or more external data stores including the configuration data are multi-tenant enabled or non-multi-tenant enabled.

The method begins at block 202, at which an FTQL query with a specified tenant property condition, e.g., tenant property condition=x, is received from a client at a uCMDB server. The tenant property condition of the FTQL query corresponds to a tenant represented by the client. This tenant property condition is added by the TQL engine 126 according to the tenants supported by the configuration item type requested by the FTQL query. The FTQL query may be a request for specific configuration data, including external configuration items located within any number of external data stores. The uCMDB server may determine which external data store includes each requested external configuration item via a federation engine of the uCMDB server, such as the federation engine 124 discussed above with respect to FIG. 1.

At block 204, it is determined whether an external data store from which one or more external configuration items is to be retrieved is multi-tenant enabled. If the external data store is not multi-tenant enabled, it may be determined whether a default tenant for the external data store matches the tenant property condition specified by the FTQL query, e.g., whether the default tenant=x, at block 206. If the default tenant for the external data store does not match the tenant property condition specified by the FTQL query, an empty result for the FTQL query may be returned to the client at block 208, since the client does not have the right to access external configuration items that belong to other tenants.

If the default tenant for the external data store matches the tenant property condition specified by the FTQL query, the method 200 may proceed to block 210. At block 210, the tenant property condition is removed from the FTQL query. The tenant property condition may be removed from the FTQL query since the external data store is not multi-tenant enabled and, thus, may be unable to use the tenant property condition. Moreover, because the default tenant of the external data store matches the tenant property condition specified by the FTQL query, the tenant property condition serves no purpose during the execution of the FTQL query within the external data store.

At block 212, the FTQL query is executed on the external data store to retrieve the corresponding external configuration items. At block 214, the uCMDB server adds the default tenant attribute value to the external configuration items retrieved from the external data store. This may ensure that the external configuration items may only be provided to clients with tenants that match the default tenant of the external data store. Thus, according to the method 200, the privacy of each tenant may be protected.

At block 216, the result of the FTQL query is returned to the client that initiated the FTQL query. The result may include the external configuration items retrieved from the external data store, as well as configuration items or other configuration data retrieved from a uCMDB and/or additional external configuration items retrieved from other external data stores. The result may also include the tenant information, which may be used to determine whether the client is to be allowed to access the result.

In contrast, if it determined at block 204 that the external data store is multi-tenant enabled, the method 200 may proceed to block 218. At block 218, the FTQL query is executed on the external data store with the specified tenant property condition, e.g., tenant property condition=x, to retrieve the corresponding external configuration items. Because the external data store is multi-tenant enabled, the FTQL query may be executed on the external data store without removing the tenant property condition.

At block 220, the external data store returns only the external configuration items corresponding to the tenant property condition specified by the FTQL query, e.g., tenant property condition=x, to the uCMDB server. According to various examples, this is accomplished by an external data store adapter corresponding to the external data store. For example, the external data store adapter may filter the retrieved external configuration items according to restrictions imposed by their respective tenant property conditions, which specify the tenants that are allowed to access each external configuration item. Thus, only external configuration items that include the tenant property condition specified by the FTQL query may be returned to the uCMDB server.

At block 216, the result of the FTQL query is returned to the client that initiated the FTQL query. The result may include the external configuration items retrieved from the external data store, as well as configuration items or other configuration data retrieved from a uCMDB and/or additional external configuration items retrieved from other external data stores. The result may also include the tenant information, which may be used to determine whether the client is to be allowed to access the result.

It is to be understood that the process flow diagram of FIG. 2 is not intended to indicate that the steps of the method 200 are to be executed in any particular order, or that all of the steps of the method 200 are to be included in every case. Further, any number of additional steps not shown in FIG. 2 may be included within the method 200, depending on the details of the specific implementation.

Figure 3:
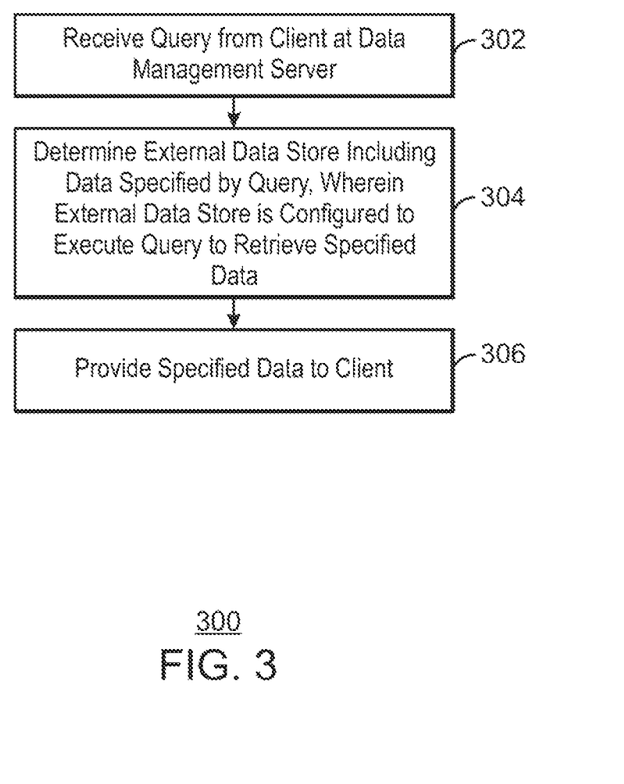
FIG. 3 is a simplified process flow diagram showing a method for supporting multi-tenancy in a federated data management system.

FIG. 3 is a simplified process flow diagram showing a method 300 for supporting multi-tenancy in a federated data management system. In various examples, the federated data management system is a federated configuration data management system, such as the federated configuration data management system 100 discussed above with respect to FIG. 1, that is configured to manage configuration data, including configuration items. Accordingly, the data management server that executes the method 300 may be a configuration data management server, such as the uCMDB server 108 discussed above with respect to FIG. 1.

The method begins at block 302, at which a query is received from a client at the data management server. The query may include a tenant property condition corresponding to the client. In addition, the query may be an FTQL query including specified data to be retrieved via a federation procedure.

At block 304, an external data store including the data specified by the query is determined. The external data store may be a multi-tenant enabled external data store or a non-multi-tenant enabled external data store. In addition, the external data store may be configured to execute the query to retrieve the specified data based on input from the data management server.

If the external data store is a multi-tenant enabled external data store, the query may be provided to the multi-tenant enabled external data store with the corresponding tenant property condition. The multi-tenant enabled external data store may be configured to execute the query and return only data corresponding to the tenant property condition to the data management server.

If the external data store is a non-multi-tenant enabled external data store, it may be determined whether a default tenant of the non-multi-tenant enabled external data store is equivalent to the tenant property condition specified by the query. If the default tenant of the non-multi-tenant enabled external data store is not equivalent to the tenant property condition specified by the query, an empty result for the query may be returned to the client. If the default tenant of the non-multi-tenant enabled external data store is equivalent to the tenant property condition specified by the query, the specified data may be retrieved from the non-multi-tenant enabled external data store. This may be accomplished by removing the tenant property condition from the query and providing the query to the non-multi-tenant enabled external data store, wherein the non-multi-tenant external data store is configured to execute the query and return the data specified by the query to the data management server. In addition, the default tenant may be added to the specified data retrieved from the non-multi-tenant external data store.

At block 306, the specified data retrieved from the external data store, as well as the corresponding tenant information, are provided to the client. The data that is provided to the client may only include data that belongs to the tenant represented by the client. Thus, the method 300 may provide for the protection of the privacy of tenants by ensuring that only allowed clients are able to retrieve data belonging to particular tenants.

It is to be understood that the process flow diagram of FIG. 3 is not intended to indicate that the steps of the method 300 are to be executed in any particular order, or that all of the steps of the method 300 are to be included in every case. Further, any number of additional steps not shown in FIG. 3 may be included within the method 300, depending on the details of the specific implementation. For example, a number of external data stores may be determined. Each external data store may be a multi-tenant enabled external data store or a non-multi-tenant enabled external data store including a portion of the data specified by the query, and each external data store may be configured to execute the query to retrieve the portion of the data. The portions of the data retrieved from the external data stores may be combined to obtain a result for query, and the result may be provided to the client.

According to some examples, a portion of the data specified by the query may be retrieved from a data management database that is communicatively coupled to the data management server. This data may then be provided to the client along with the data retrieved from the one or more external data stores.

Figure 4:
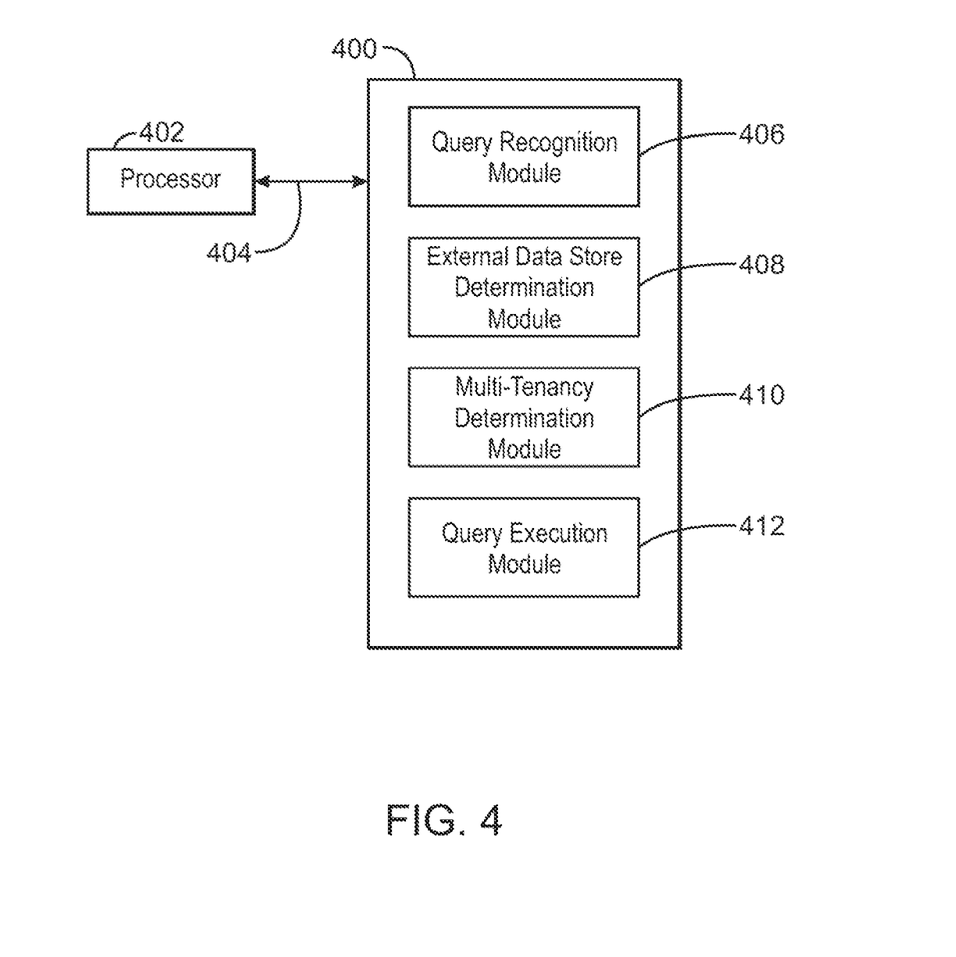
FIG. 4 is a block diagram showing a tangible, non-transitory, computer-readable medium that stores a protocol adapted to support multi-tenancy in a federated data management system.

FIG. 4 is a block diagram showing a tangible, non-transitory, computer-readable medium 400 that stores a protocol adapted to support multi-tenancy in a federated configuration data management system. The tangible, non-transitory, computer-readable medium 400 may be accessed by a processor 402 over a computer bus 404. Furthermore, the tangible, non-transitory, computer-readable medium 400 may include code to direct the processor 402 to perform the steps of the current method.

The various software components discussed herein may be stored on the tangible, non-transitory, computer-readable medium 400, as indicated in FIG. 4. For example, a query recognition module 406 may be configured to receive a query from a client, wherein the query may include a tenant property condition corresponding to the client. An external data store determination module 408 may be configured to determine one or more external data stores from which data specified by the query may be retrieved. A multi-tenancy determination module 410 may be configured to determine where each of the one or more external data stores is multi-tenant enabled or non-multi-tenant enabled, as well as whether each of the one or more external data stores supports a tenant specified by the tenant property condition corresponding to the client.

A query execution module 412 may be configured to direct the execution of the query within each of the external data stores to retrieve the specified data. The query execution module 412 may be configured to direct the execution of the query based on whether each external data store is multi-tenant enabled or non-multi-tenant enabled. In addition, the query execution module 412 may be configured to provide the query result, including the data retrieved from the one or more external data stores, to the client.

It is to be understood that FIG. 4 is not intended to indicate that all of the software components discussed above are to be included within the tangible, non-transitory, computer-readable medium 400 in every case. Further, any number of additional software components not shown in FIG. 4 may be included within the tangible, non-transitory, computer-readable medium 400, depending on the details of the specific implementation.

The present examples may be susceptible to various modifications and alternative forms and have been shown only for illustrative purposes. For example, the present techniques support both reading and writing operations to a data structure cache. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A method comprising:
   receiving a query from a client at a data management server comprising a processor, wherein the query comprises a tenant property condition corresponding to the client;
   identifying, by the data management server, an external data store comprising data specified by the query comprising the tenant property condition;
   determining, by the data management server, whether the external data store is multi-tenant enabled or non-multi-tenant enabled; and
   in response to determining that the external data store is non-multi-tenant enabled:
      determining whether a default tenant defined for the non-multi-tenant enabled external data store matches the tenant property condition specified by the query;
      in response to determining that the default tenant defined for the non-multi-tenant enabled external data store matches the tenant property condition specified by the query, removing, by the data management server, the tenant property condition from the query, executing the query, with the tenant property condition removed from the query, on the non-multi-tenant enabled external data store to retrieve the data specified by the query, and adding tenant information of the default tenant to the data specified by the query that is returned to the client; and
      in response to determining that the default tenant defined for the non-multi-tenant enabled external data store does not match the tenant property condition specified by the query, returning an empty result for the query to the client.

2. The method of claim 1, comprising providing the data specified by the query retrieved from the non-multi-tenant enabled external data store to the client.

3. The method of claim 1, comprising, in response to determining that the external data store is multi-tenant enabled, providing the query with the tenant property condition to the multi-tenant enabled external data store, wherein the multi-tenant enabled external data store is configured to execute the query and return only data corresponding to the tenant property condition to the data management server.

4. The method of claim 1, wherein executing the query, with the tenant property condition removed, on the non-multi-tenant enabled external data store to retrieve the data specified by the query comprises:
   providing the query, with the tenant property condition removed, to the non-multi-tenant enabled external data store, wherein the non-multi-tenant enabled external data store is configured to execute the query, with the tenant property condition removed, and return the data specified by the query, with the tenant property condition removed, to the data management server.

5. The method of claim 1, comprising:
   identifying a plurality of external data stores, wherein each external data store of the plurality of external data stores comprises a portion of the data specified by the query, and wherein each external data store is configured to execute the query to retrieve the portion of the data;
   combining, by the data management server, the portions of the data retrieved from the plurality of external data stores to obtain a result for the query; and
   providing the result to the client.

6. The method of claim 1, comprising:
   retrieving a portion of the data specified by the query from a data management database that is communicatively coupled to the data management server; and
   providing the portion of the data retrieved from the data management database to the client.

7. A computing system for supporting multi-tenancy, comprising:
   a processor;
   a federation code executable on the processor to:
      determine an external data store comprising data specified by a topology query language (TQL) query received from a client, wherein the TQL query comprises a tenant property condition; and
      determine whether the external data store is a multi-tenant enabled external data store or a non-multi-tenant enabled external data store; and
   a TQL code executable on the processor to:
      in response to determining that the external data store is a multi-tenant enabled external data store, direct retrieval of data specified by the TQL query from the external data store based on the tenant property condition specified by the TQL query; and
      in response to determining that the external data store is a non-multi-tenant enabled external data store:
         determine whether a default tenant defined for the non-multi-tenant enabled external data store matches the tenant property condition specified by the TQL query;
         in response to determining that the default tenant defined for the non-multi-tenant enabled external data store does not match the tenant property condition specified by the TQL query, return an empty result for the TQL query to the client; and
         in response to determining that the default tenant defined for the non-multi-tenant enabled external data store matches the tenant property condition specified by the TQL query, remove the tenant property condition from the TQL query, and execute the TQL query, with the tenant property condition removed from the TQL query, on the external data store.

8. The computing system of claim 7, wherein the federation code is executable on the processor to:
   add information relating to the default tenant to result data retrieved from the non-multi-tenant enabled external data store responsive to executing the TQL query, with the tenant property condition removed from the TQL query, on the external data store.

9. A non-transitory, computer-readable medium comprising code that upon execution causes a computing system to:
   receive a query from a client, wherein the query comprises a tenant property condition;

determine an external data store comprising data specified by the query;

determine whether the external data store comprises a multi-tenant enabled external data store or a non-multi-tenant enabled external data store;

in response to determining that the external data store is a multi-tenant enabled external data store, retrieve only data corresponding to the tenant property condition from the multi-tenant enabled external data store;

in response to determining that the external data store is a non-multi-tenant enabled external data store:

determine whether a default tenant defined for the non-multi-tenant enabled external data store matches the tenant property condition specified by the query; and in response to determining that the default tenant matches the tenant property condition, retrieve the data specified by the query from the non-multi-tenant enabled external data store based on executing the query, with the tenant property condition removed, on the non-multi-tenant enabled external data store; and provide the data specified by the query retrieved from the external data store to the client.

10. The non-transitory, computer-readable medium of claim 9, wherein the code upon execution causes the computing system to, in response to determining that the default tenant defined for the non-multi-tenant enabled external data store does not match the tenant property condition specified by the query, return an empty result for the query to the client.

11. The method of claim 3, wherein the data corresponding to the tenant property condition comprises data corresponding to a tenant that matches the tenant property condition.

12. The method of claim 1, wherein the tenant property condition specifies a tenant corresponding to the client.

13. The method of claim 1, further comprising:

using the data specified by the query retrieved from the non-multi-tenant enabled external data store to manage an information technology service.

14. The non-transitory, computer-readable medium of claim 9, wherein the code upon execution causes the computing system to use the data specified by the query retrieved from the non-multi-tenant enabled external data store to manage an information technology service.

15. The computing system of claim 7, wherein the TQL code is executable on the processor to:

add tenant information of the default tenant to data retrieved from the non-multi-tenant enable external data store in response to the TQL query with the tenant property condition removed; and return the data retrieved from the non-multi-tenant enable external data store with the added tenant information of the default tenant to the client.

16. The non-transitory, computer-readable medium of claim 9, wherein the code upon execution causes the computing system to:

add tenant information of the default tenant to data retrieved from the non-multi-tenant enabled external data store in response to the query with the tenant property condition removed; and return the data retrieved from the non-multi-tenant enable external data store with the added tenant information of the default tenant to the client.

17. The computing system of claim 7, wherein the computing system comprises a configuration management database (CMDB) server within a federated configuration data management system, and wherein the data specified by the TQL query comprises configuration data.

18. The computing system of claim 7, wherein the directing of retrieval of the data specified by the TQL query from the multi-tenant enabled external data store comprises providing the TQL query with the tenant property condition to the multi-tenant enabled external data store, and wherein the multi-tenant enabled external data store is configured to execute the query and return only data corresponding to a tenant matching the tenant property condition to the computing system.

19. The computing system of claim 17, wherein the configuration data is related to management of an information technology service.

* * * * *